United States Patent
Yu et al.

(10) Patent No.: US 9,815,667 B2
(45) Date of Patent: Nov. 14, 2017

(54) COATED SHEAVE

(75) Inventors: Xiaomei Yu, Glastonbury, CT (US);
Yan Chen, South Windsor, CT (US);
David R. Polak, Glastonbury, CT (US);
Daniel V. Viens, Mansfield Center, CT (US); John P. Wesson, Vernon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 46 days.

(21) Appl. No.: 14/401,378

(22) PCT Filed: May 16, 2012

(86) PCT No.: PCT/US2012/038046
§ 371 (c)(1),
(2), (4) Date: Nov. 14, 2014

(87) PCT Pub. No.: WO2013/172824
PCT Pub. Date: Nov. 21, 2013

(65) Prior Publication Data
US 2015/0166307 A1    Jun. 18, 2015

(51) Int. Cl.
| | |
|---|---|
| *B05D 3/12* | (2006.01) |
| *B66B 15/02* | (2006.01) |
| *B66B 15/04* | (2006.01) |
| *B05D 3/10* | (2006.01) |
| *F16H 55/36* | (2006.01) |

(Continued)

(52) U.S. Cl.
CPC .............. *B66B 15/02* (2013.01); *B05D 3/10* (2013.01); *B05D 3/12* (2013.01); *B66B 15/04* (2013.01); *B05D 3/002* (2013.01); *B05D 5/083* (2013.01); *F16H 2055/366* (2013.01)

(58) Field of Classification Search
CPC ... B66B 15/02; B66B 15/04; F16H 2055/366; B05D 3/12; B05D 3/108; B05D 3/10; B05D 3/101; B05D 3/102; B05D 3/104
See application file for complete search history.

(56) References Cited

U.S. PATENT DOCUMENTS

| 5,532,724 A | * | 7/1996 | Inagaki | ............... B41J 2/0057 347/213 |
|---|---|---|---|---|
| 7,186,300 B2 | * | 3/2007 | Giacobbi | ............ C08G 65/007 134/26 |

(Continued)

FOREIGN PATENT DOCUMENTS

| EP | 0585852 A2 | 3/1994 |
|---|---|---|
| EP | 0832908 A1 | 4/1998 |

(Continued)

OTHER PUBLICATIONS

International Search Report for application PCT/US2012/038046, dated Aug. 23, 2013, 6 pages.

(Continued)

*Primary Examiner* — Emmanuel M Marcelo
(74) *Attorney, Agent, or Firm* — Cantor Colburn LLP

(57) ABSTRACT

A method for applying a coating to a substrate includes obtaining a fluorinated polymer compound, where the fluorine is chemically or covalently bonded to the polymer molecule; and coating the surface of the substrate with the fluorinated polymer compound.

20 Claims, 2 Drawing Sheets

(51) Int. Cl.
*B05D 5/08* (2006.01)
*B05D 3/00* (2006.01)

(56) References Cited

U.S. PATENT DOCUMENTS

| | | | |
|---|---|---|---|
| 7,883,634 B2* | 2/2011 | Thompson | B29C 59/02 |
| | | | 216/38 |
| 2001/0036328 A1* | 11/2001 | Yamamoto | F16C 19/525 |
| | | | 384/462 |
| 2003/0087103 A1* | 5/2003 | Belmares | C09D 127/12 |
| | | | 428/421 |
| 2003/0091746 A1 | 5/2003 | Takahashi et al. | |
| 2005/0112286 A1* | 5/2005 | Nguyen | B05D 3/0209 |
| | | | 427/384 |
| 2005/0136180 A1 | 6/2005 | Pellerite | |
| 2006/0070822 A1 | 4/2006 | Osada et al. | |
| 2008/0289912 A1 | 11/2008 | Perron | |
| 2011/0081490 A1* | 4/2011 | Comeau | A63B 45/00 |
| | | | 427/322 |
| 2011/0318575 A1* | 12/2011 | Rolfes Meyering | A61L 27/16 |
| | | | 428/336 |
| 2015/0291827 A1* | 10/2015 | Lee | C08G 18/0819 |
| | | | 428/141 |
| 2016/0089695 A1* | 3/2016 | Rodriguez-Santiago | B05D 1/185 |
| | | | 428/447 |

FOREIGN PATENT DOCUMENTS

| | | |
|---|---|---|
| EP | 1201698 | 5/2002 |
| EP | 1312655 A2 | 5/2003 |

OTHER PUBLICATIONS

Written Opinion for application PCT/US2012/038046, filing date May 16, 2012, dated Aug. 23, 2013, 5 pages.

Search Report regarding related EP App. No. 12876802.5; dated May 18, 2016; 9 pgs.

* cited by examiner

COATED SHEAVE

FIELD OF INVENTION

The subject matter disclosed herein relates generally to coated sheaves, such as sheaves used elevator systems, and more particularly, to a sheave coated with a fluorinated polymer compound.

DESCRIPTION OF RELATED ART

Traction elevator systems utilize lifting belts or ropes that are operably connected to an elevator car, and routed over one or more sheaves to propel the elevator along a hoistway. Coated belts or ropes, in particular, can include one or more cords within a jacket material. The cords could be formed from any suitable material such as steel or synthetic fiber, and could comprise a plurality of wires arranged into one or more strands and then arranged into the one or more cords.

These elevator systems rely upon sufficient traction between a sheave driven by the elevator propulsion device, also called a traction or drive sheave, and the belt for several reasons. First, sufficient traction ensures that the belt moves along with the traction sheave during rotation of the traction sheave in order to achieve the desired movement of the elevator car and/or counterweight. Second, sufficient traction ensures that the belt does not move relative to the traction sheave when the traction sheave is not rotating in order to keep the elevator car at a desired position such as, for example, when the elevator car is at a landing. These elevator systems may also include one or more other sheaves, for example idler sheaves, that help to guide the belt around various components of the elevator system in a desired arrangement. Over time these belts may change their surface properties and alter the interaction between the belt and the sheave. Under certain conditions, the belt could slip relative to the sheave. This slip condition can result in an undesired noise. The undesired noise could travel through the air in the hoistway or vibration could travel along the belt to other components of the elevator system.

Prior attempts to mitigate the noise have focused on reducing the coefficient of friction (COF) between the belt and an idler sheave surface. However, mitigating noise by limiting the COF is impractical since the COF can vary by the surface chemistry of belts and the age of the belt. Also, a small amount of interaction between the belt and the sheave by friction is desired so that frictional forces generate a steering force to guide the belt on the sheave. One existing coating for elevator idler sheaves is disclosed in International Patent Publication WO2007075163, in the name of Perron and assigned to the same Assignee of this application. Perron discloses a metallic coating having fluoropolymer added thereto to establish a desired coefficient of friction.

BRIEF SUMMARY

According to one aspect of the invention, a method for applying a coating to a substrate includes obtaining a fluorinated polymer compound, where the fluorine is chemically or covalently bonded to the polymer molecule; and coating the surface of the substrate with the fluorinated polymer compound.

Additionally or alternatively, the method includes subjecting the surface of the component to a post-treatment process after coating the surface.

Additionally or alternatively, the post-treatment process comprises drying the component in an environment including a temperature and relative humidity.

Additionally or alternatively, the temperature of the drying environment is in the range of about 10 degree Celsius to about 32 degree Celsius.

Additionally or alternatively, the relative humidity of the drying environment is less than 85 percent.

Additionally or alternatively, the method includes subjecting the surface of the component to a surface pre-treatment process to provide a pre-treated surface prior to coating.

Additionally or alternatively, the pre-treatment process comprises roughening of the surface with an abrasive.

Additionally or alternatively, the roughening further comprises a commercial blast cleaning using SSPC-SP 6 or SSPC-SP 10 standards.

Additionally or alternatively, the pre-treatment process further comprises etching the surface with a phosphoric acid based solution.

Additionally or alternatively, the method includes chemically cleaning the pre-treated surface with a solution of acid catalyzed vinyl wash primer.

Additionally or alternatively, the method includes applying a primer to the pre-treated surface.

According to one aspect of the invention, a sheave comprises a substrate including a surface; and a fluorinated polymer compound, the fluorinated polymer compound including fluorine chemically or covalently bonded to a polymer molecule; wherein the surface is coated with the fluorinated polymer compound.

Additionally or alternatively, the surface has an average roughness value ($R_a$) in a range of between about 25 microns and about 50 microns before the fluorinated polymer compound is applied.

Additionally or alternatively, the surface has a surface tension contact angle θ of less than about 45 degrees.

Additionally or alternatively, the fluorinated polymer compound has a thickness in a range of between about 30 microns to about 100 microns.

Additionally or alternatively, the sheave is an idler sheave.

Additionally or alternatively, the substrate is one of a metal alloy, a ceramic, a polymer, a polymer composite, or a metallic core coated with a ceramic or base polymer.

Other aspects, features, and techniques of the invention will become more apparent from the following description taken in conjunction with the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
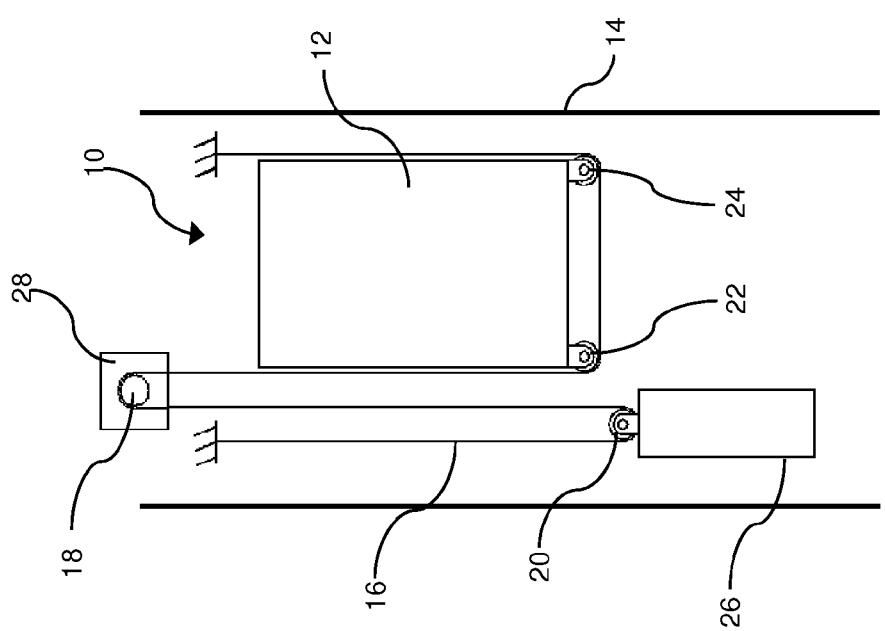
FIG. 1 schematically shows selected portions of an example elevator system including at least one sheave according to an embodiment of this invention.

FIG. 1 illustrates an example elevator system 10 including an elevator car 12 coupled to one or more lifting and/or suspending belts or ropes, generally referred to herein as belt 16. Belt 16 may be a coated, steel belt in embodiments of the invention. Elevator car 12 is suspended or supported in a hoistway 14 with belt 16. Belt 16 is routed around the various components of the elevator system 10 by interacting with a traction sheave 18 and idler sheaves 20, 22, 24. Belt 16 may also be connected to a counterweight 26, which is used to help balance the elevator system 10 and reduce the difference in belt tension on both sides of the traction sheave 18 during operation. Belt 16 supports the weight of the car 12 and the counterweight 26 in a known manner.

Traction sheave 18 is driven by a machine 28. Movement of traction sheave 18 by the machine 28 drives, moves and/or propels (through traction) belt 16 to move car 12. The idler sheaves 20, 22, 24 are not driven by a machine 28, but help guide belt 16 around the various components of the elevator system 10. One or more of the idler sheaves 20, 22, 24 may have a convex shape or crown along its axis of rotation to assist in keeping belt 16 centered, or in a desired position, along the idler sheaves 20, 22, 24.

One or more of the idler sheaves 20, 22, 24 can have a surface chemistry for facilitating a lower work of adhesion with the belt 16. Work of adhesion is a measure of the attraction between two surfaces, which is based on the surface energies of the surfaces. In other words, it is the work required to create two new surfaces when two different materials are separated. In embodiments, the work of adhesion is a function of the surface energies of the belt 16 and the sheaves 20, 22, 24. If the work of adhesion becomes too large, noise and/or vibration may be introduced in the elevator system. A low surface energy on the idler sheaves 20, 22, 24 allows for a wide range of surface energies on the belt 16 without introducing undesired noise/vibration. Some friction on the idler sheaves 20, 22, 24 may be desirable to help keep belt 16 centered on the idler sheave.

Figure 2:
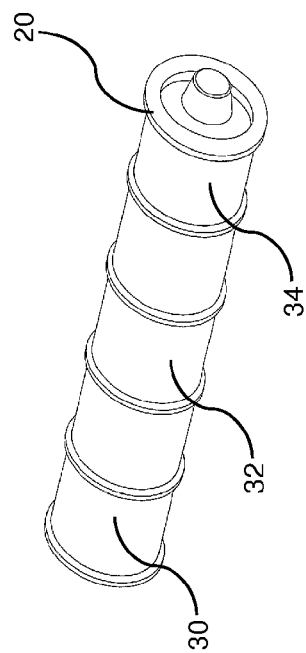
FIG. 2 is a perspective view of an example idler sheave according to an embodiment of the invention.

FIG. 2 shows an example of a sheave, such as idler sheave 20 according to an embodiment of the invention. Idler sheave 20 includes a substrate having one or more idler contact surfaces 30, 32, 34 which are configured for receiving one or more coated steel belts 16. The contact surfaces 30, 32, 34 could be substantially similar to each other. In the example shown, the plurality of surfaces 30, 32, 34 have a convex shape for keeping the one or more belts 16 centered or in a desired position. In some examples, belt 16 may be a new or used polyurethane coated steel belt.

Figure 3:
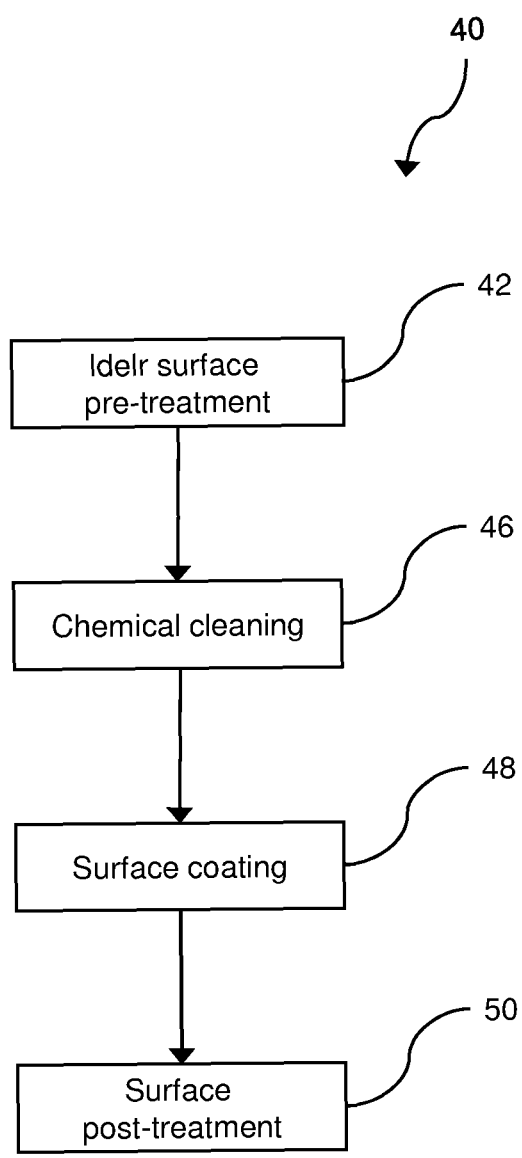
FIG. 3 illustrates a flow chart of a process for coating a sheave according to an embodiment of the invention.

FIG. 3 illustrates an exemplary process 40 to coat a surface of an idler sheave such as, for example, one or more of the contact surfaces 30, 32, 34 of idler sheave 20 to provide improved surface characteristics such as reduced surface energy. The exemplary process 40 is described with reference to an idler sheave 20 made of mild carbon steel. Idler sheaves made from other metal alloys such as, for example, aluminum alloys may be utilized without departing from the scope of the invention. Sheaves made from other materials, such as ceramics, polymers, polymer composites, and metal cores coated with a ceramic or base polymer, may be coated using the processes described herein. Further, the coating described herein may be used with traction sheaves or deflector sheaves, and embodiments are not limited to idler sheaves.

Process 40 begins with surface pre-treatment 42, during which the surface 30 undergoes treatment(s) to yield a surface suitable for a subsequent coating of polymer materials. It is to be appreciated that the processing for surface 30 is also applicable to surfaces 32 and 34. According to one exemplary process, the pre-treatment of surface 30 includes a mechanical roughening of surface 30 using a commercial blast cleaning through the use of abrasives to yield an average surface roughness, Ra, of about 1.5 mils to about 2 mils (about 25 microns to about 50 microns). In an embodiment, a commercial blast cleaning using the SSPC-SP 6 standard specified by the Society for Protective Coatings is utilized although, in another embodiment, a near-white blast cleaning is performed using the SSPC-SP 10 standard. The surface pre-treatment 42 may remove all visible oil, grease, dust, dirt, mill scale, rust, coating, oxides, corrosion products, and/or other foreign matter. Thereafter, any grease, metal particles, and/or contaminants can be removed by a suitable technique such as solvent rinsing, solvent emulsion cleaning or the like. In an exemplary embodiment, for an aluminum alloy idler sheave, surface 30 is additionally etched with a phosphoric acid based cleaning solution after mechanical roughing.

After surface pre-treatment 42, a chemical cleaning 46 may be performed to enhance the adhesion of polymer coatings to the surface 30. In an embodiment, the chemical cleaning 46 may be performed with a solution of acid catalyzed vinyl wash primer such as, for example, a primer solution conforming to U.S. Department of Defense Military Standard DOD-P-13582D, F-117 such as E90G4 (58% 2-propanol, 20% 1-butanol, and 8% chromium zinc oxide) or V93VC2 (65% 2-propanol, 16% phosphoric acid) manufactured by Sherwin Williams® or the like. For the purpose of evaluating the chemical cleaning 46, the surface energy of the primed surface may be calculated based on a contact angle measurement (A) having high wettability. The contact angle $\theta$ may be measured with a goniometer, e.g., a ramé-hart surface energy Goniometer 500, using an epoxy based primer solution as the liquid phase for the measurement. The chemical cleaning 46 may be repeated until the contact angle $\theta$ is less than about 45 degrees. In an embodiment, an epoxy polyamide primer such as, for example, 21EP150 manufactured by $21^{st}$ Century Coatings, Incorporated or equivalent primer is sprayed onto the entire surface 30 following chemical cleaning.

Once the surface 30 has undergone chemical cleaning 46, it is thereafter subjected to a surface coating 48 with a polymer having a fluorine chemistry. In one exemplary embodiment, a fluorinated polyurethane is applied. An exemplary fluorinated polyurethane is the WC™ series of Fluorinated Polyurethane (FPU™) manufactured by $21^{st}$ Century Coatings, Incorporated under licenses from the U.S. Naval Research Laboratory, which includes fluorine chemistry incorporated into a polyurethane polymer material by polymer blending, grafting, or copolymerization. In embodiments, the fluorinated polyurethane is applied by spraying, brushing, casting, or the like. In another exemplary embodiment, the fluorinated polyurethane may be applied in its liquid or dry powder form. In exemplary embodiments, the thickness of the coating may range from about 30 microns to about 100 microns.

Fluorinated polyurethane is one exemplary coating. In general, coatings in embodiments of the invention include fluorine chemically or covalently bonded to a polymer molecules, in a side chain. This is to be contrasted with existing coatings, in which fluorine is added by physically mixing/blending with a polymer matrix. Embodiments may include two part curable materials and formable thermoplastic materials such as urethanes, epoxies, polyesters, polyureas, polyamides, polyimides or silicones, along with fluorine in a side chain of the polymer molecule. In one exemplary embodiment, a fluorinated epoxy is applied. An exemplary fluorinated epoxy is the Coraflon ADS™ series of Fluorinated Epoxies manufactured by Coatings West Inc.

Using a polymer having a bonded fluorine structure provides advantages over using fluorine filler particles such as 1) more uniform lowering of surface energy 2) greater range of polymer matrices available for use 3) reduced tendency to transfer material to the belt and 4) greater robustness and durability over product life.

Following the coating process 48, surface 30 may be subjected to a post-treatment process 50 to cure the fluorinated polyurethane coating in order to obtain a final coating having the desired surface characteristics. This includes drying the surface in a controlled temperature and relative humidity environment for a predetermined curing time. Exemplary post treatment environments include temperatures of about 50 degrees Fahrenheit (10 degrees Celsius) to about 90 degrees Fahrenheit (32 degrees Celsius), relative humidity of less than about 85 percent, and a curing time from about 24 hours to about 48 hours. The exemplary Fluorinated Polyurethane (FPU™) coating provides a topcoat that has very low surface energy, is extremely stable (chemically non-reactive), flexible, abrasion resistant, and impermeable to oxygen and water. Additionally, the coating's impermeability protects surface 30 from corrosion and abrasion. The coating defines a predetermined surface energy of surface 30, which keeps the work of adhesion Wa below a predetermined maximum threshold.

The technical effects and benefits of exemplary embodiments include a method for coating an idler sheave involving surface pretreatment, chemical cleaning, a surface coating with a fluorinated polymer followed by surface post-treatment. The method yields an idler sheave surface having superior surface characteristic including low surface energy, lower work of adhesion with new and aged belts, impermeable to oxygen and water, flexible and chemically and thermally stable.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for making a coated sheave, comprising:
obtaining a sheave comprising a contact surface;
obtaining a fluorinated polymer compound selected from polyurethanes, epoxy polymers, polyesters, polyureas, polyamides, polyimides, or silicones, where fluorine is chemically or covalently bonded to the polymer; and
coating the sheave contact surface with the fluorinated polymer compound.

2. The method of claim 1, further comprising subjecting the sheave contact surface to a post-treatment process after coating the surface.

3. The method of claim 2, wherein the post-treatment process comprises drying the sheave in an environment including controlled temperature and relative humidity.

4. The method of claim 3, wherein the temperature of the environment is in the range of about 10 degree Celsius to about 32 degree Celsius.

5. The method of claim 3, wherein the relative humidity of the environment is less than 85 percent.

6. The method of claim 1, further comprising subjecting the sheave contact surface to a surface pre-treatment process to provide a pre-treated surface prior to coating.

7. The method of claim 6, wherein the pre-treatment process comprises roughening of the surface with an abrasive.

8. The method of claim 7, wherein the roughening further comprises a commercial blast cleaning using SSPC-SP 6 or SSPC-SP 10 standards.

9. The method of claim 6, wherein the pre-treatment process further comprises etching the surface with a phosphoric acid based solution.

10. The method of claim 6, further comprising chemically cleaning the pre-treated surface with a solution of acid catalyzed vinyl wash primer.

11. The method of claim 10, further comprising applying a primer to the pre-treated surface.

12. A sheave comprising:
a substrate including a surface; and
a fluorinated polymer compound selected from polyurethanes, epoxy polymers, polyesters, polyureas, polyamides, polyimides, or silicones, the fluorinated polymer compound including fluorine chemically or covalently bonded to the polymer;
wherein the surface is coated with the fluorinated polymer compound.

13. The sheave of claim 12, wherein the surface has an average roughness value (Ra) in a range of between about 25 microns and about 50 microns before the fluorinated polymer compound is applied.

14. The sheave of claim 12, wherein the surface has a surface tension contact angle δ of less than about 45 degrees.

15. The sheave of claim 12, wherein the fluorinated polymer compound has a thickness in a range of between about 30 microns to about 100 microns.

16. The sheave of claim 12, wherein the sheave is an idler sheave.

17. The sheave of claim 12, wherein the sheave is a traction sheave.

18. The sheave of claim 12, wherein the sheave is a deflector sheave.

19. The sheave of claim 12, wherein the substrate is one of a metal alloy, a ceramic, a polymer, a polymer composite, or a metallic core coated with a ceramic or base polymer.

20. The sheave of claim 12, wherein the fluorinated compound comprises a polyurethane.

* * * * *